Patented Nov. 8, 1927.

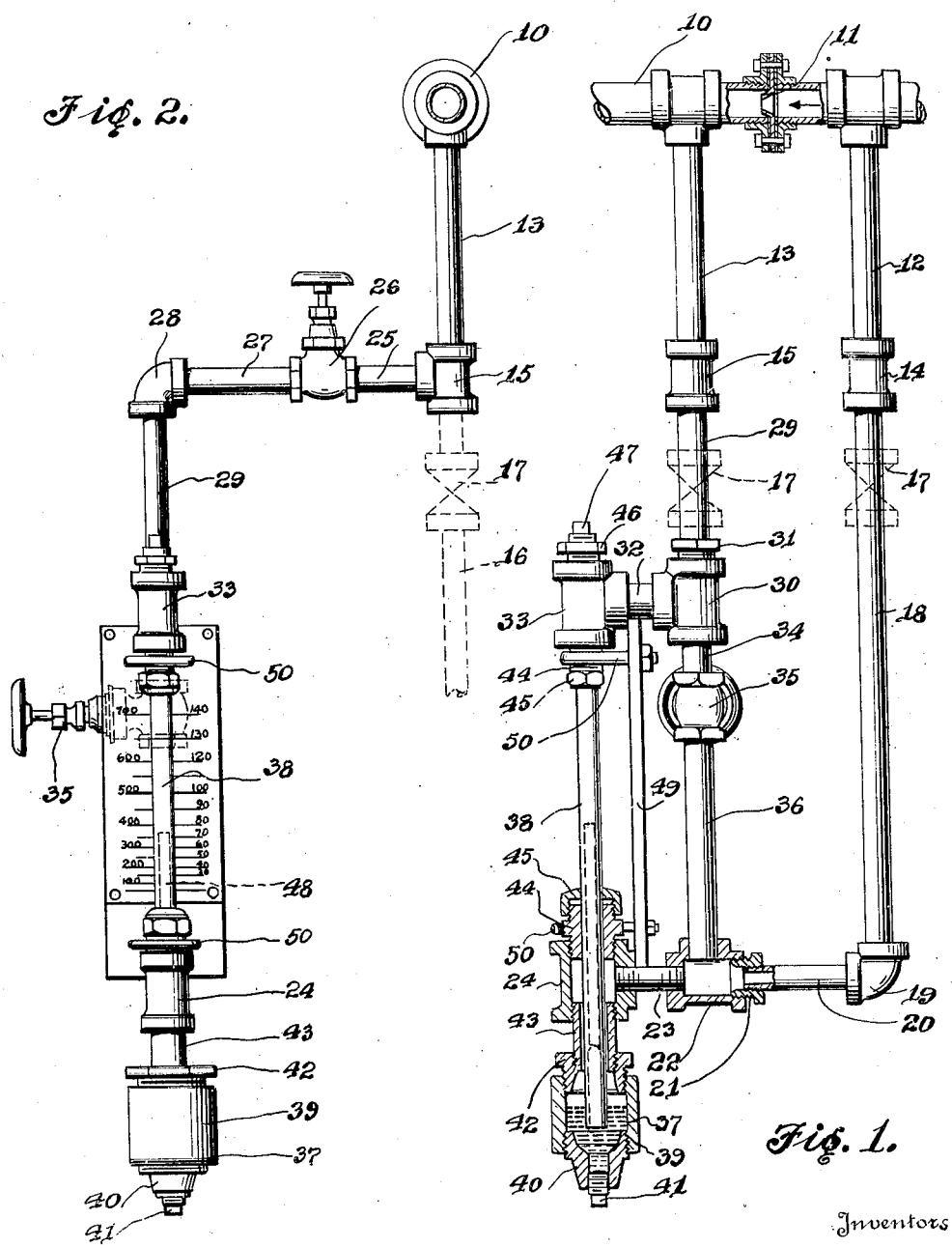

1,648,496

UNITED STATES PATENT OFFICE.

VIRGIL ELLSWORTH METCALFE AND FRANK MALLEN, JR., OF DELICIAS, CUBA.

FLOW METER.

Application filed April 30, 1925. Serial No. 26,952.

This invention relates to a flow meter and has for its object the provision of a flow meter that can be constructed at a cost that is very low compared with the cost of flow meters of no greater accuracy. With this object in view there is provided a flow meter constructed of standard pipe parts and fittings and provided with a proper orifice device.

For a complete understanding of the invention reference is to be had to the following description and to the accompanying drawings forming a part of this specification.

Referring to the drawings:—

Fig. 1 is a side view in elevation and partly sectional of the flow meter embodying the invention; and Fig. 2 is a front view in elevation.

Referring to the drawings in detail, the reference character 10 designates the pipe or conduit through which flow is to be measured. Within the pipe 10 is positioned a suitable orifice device or plate 11. Pipes 12 and 13 are connected to the pipe 10 in back of and ahead of the orifice 11. Connected to the pipes 12 and 13 are T's 14 and 15, respectively. Connected to each of the T's 14 and 15 is a pipe 16 provided with a blow-down valve 17. A pipe 18 of suitable length is connected at one side to the T 14 and at the other end to an L 19 and by a nipple 20 to a T 22 through a bushing 21. The T 22 is connected by a short nipple 23 to a T 24 of the manometer gage.

Connected to the T 15 is a nipple 25 connected at its other end to a valve 26, the other side of the valve 26 being connected to a nipple 27 leading through an L 28 to a nipple 29 which connects with a T 30 and through a short nipple 32 with another T 33 of the manometer. The T 30 connects with a valve 35 through a short nipple 34, the valve 35 connecting with the T 22 through a nipple 36. The valve 35 is a pressure equalizing valve the function of which is well known. It will be understood that when flow is measured the valve 35 will be closed.

The gage or manometer comprises the T's 24 and 33, already described and connected to the pipes 12 and 13, respectively, through the several pipes and pipe fittings also previously described. The gage also comprises the mercury well 37 and the indicator glass 38. The well 37 comprises the pipe sleeve 39 closed at its bottom by the plug 40 drilled and tapped for the closing plug 41. The top of the well 39 communicates with the T 24 through the bushing 42 and the nipple 43. The indicator glass 38 communicates with the well 37 at its lower end and with the T 33 at its upper end passing through suitable stuffing boxes comprising bushings 44 and gland nuts 45. It will be understood that suitable washers may be provided for the stuffing boxes. The top of the T 33 is closed by a plug 46 drilled and tapped for a closing plug 47.

Within the indicator glass 38 is a hard wood float 48. A suitably calibrated reading plate 49 is secured preferably by U-bolt clamps 50.

From the foregoing description it is obvious that the flow meter is constructed entirely of standard pipes and pipe fittings, valves and the like. It will be understood that the calibration of the scale will be varied in accordance with the characteristics of the orifice plate and the fluids metered.

Having thus described our invention, what we claim and desire to secure by Letters Patent of the United States is:

1. A flow meter comprising a pressure difference creating device, a T section for communication with one side of said pressure-difference creating device, another T section for communication with the other side of said pressure-difference creating device, a liquid reservoir having means communicating with one of said T sections whereby the pressure in said T section is transmitted to the liquid in said reservoir, and a hollow transparent rod connected in communication with the other of the T sections and passing through said T section communicating with said liquid reservoir into said reservoir whereby to submit the liquid in said reservoir to the pressure in said first mentioned T section.

2. A flow meter comprising a reservoir consisting of a pipe sleeve having a closure plug, two T sections, a hollow transparent rod connected to one of said T sections, passing through the other of said T sections into said reservoir whereby to transmit the pressure in said first T section to said reservoir, a nipple connecting said reservoir with the other of said T sections whereby to submit the liquid in said reservoir to the pressure in said T section, a pressure-difference creating device, means connecting one of said T sections to one side of said pressure-creating device, and means connecting said other T section to the other side of said pressure-creating device.

In testimony whereof we hereunto affix our signatures.

VIRGIL ELLSWORTH METCALFE.
FRANK MALLEN, Jr.